(12) United States Patent
Pullman

(10) Patent No.: US 7,214,323 B2
(45) Date of Patent: *May 8, 2007

(54) METHOD FOR TREATING BODY WASTE MATERIAL, AND APPARATUS THEREFOR

(75) Inventor: Douglas G. Pullman, Watford (CA)

(73) Assignee: Roger H. Woods Limited, Ontario (CA)

(*) Notice: Subject to any disclaimer, the term of this patent is extended or adjusted under 35 U.S.C. 154(b) by 0 days.

This patent is subject to a terminal disclaimer.

(21) Appl. No.: 10/656,003

(22) Filed: Sep. 5, 2003

(65) Prior Publication Data

US 2004/0112847 A1 Jun. 17, 2004

(30) Foreign Application Priority Data

Sep. 5, 2002 (CA) .................................. 2401396

(51) Int. Cl.
*C02F 9/02* (2006.01)

(52) U.S. Cl. ..................... 210/780; 210/787; 210/805; 210/806

(58) Field of Classification Search ................ 210/744, 210/767, 780, 787, 790, 805, 806, 121, 125, 210/195.1, 196, 258, 259, 388, 389, 416.1, 210/512.1, 512.2, 768, 769, 785, 788, 791
See application file for complete search history.

(56) References Cited

U.S. PATENT DOCUMENTS

| | | | | |
|---|---|---|---|---|
| 2,345,238 A | * | 3/1944 | Christensen | 426/465 |
| 2,453,465 A | | 11/1948 | Sloan | |
| 2,757,115 A | * | 7/1956 | Heritage | 428/338 |
| 2,790,782 A | * | 4/1957 | Hillard, Jr. | 502/432 |
| 2,795,403 A | | 6/1957 | Mead | |
| 2,826,370 A | * | 3/1958 | Weston | 241/20 |
| 2,885,154 A | * | 5/1959 | Eastman et al. | 241/5 |
| 2,919,898 A | | 1/1960 | Marwil | |
| 2,941,783 A | | 6/1960 | Stinson | |
| 3,233,874 A | | 2/1966 | Betulius | |
| 3,638,791 A | * | 2/1972 | Harrison | 209/39 |
| 3,713,499 A | | 1/1973 | Arscott et al. | |
| 3,899,414 A | * | 8/1975 | Hansen | 209/17 |
| 3,989,628 A | * | 11/1976 | Bier | 210/255 |
| 4,090,523 A | * | 5/1978 | Kelly et al. | 134/18 |
| 4,184,771 A | | 1/1980 | Day | |
| 4,210,166 A | | 7/1980 | Munie | |
| 4,214,887 A | * | 7/1980 | van Gelder | 71/9 |
| 4,222,529 A | | 9/1980 | Long | |
| 4,250,023 A | | 2/1981 | Samis et al. | |
| 4,306,967 A | * | 12/1981 | Trautwein | 210/167 |

(Continued)

*Primary Examiner*—Matthew O. Savage
(74) *Attorney, Agent, or Firm*—Merchant & Gould P.C.

(57) ABSTRACT

A method of treating fluid body waste material includes, separating the material into factions, in which the solids content of one faction is increased substantially relative to the originating waste material, while a second faction has an increased liquid content. Material is pumped from a storage facility, passing through a first screen. Retained solid material is removed from the screen while partially cleansed liquid passes to a holding tank. The partially cleansed liquid is then passed through one or more cyclone separators. The output containing larger particles is passed to a second, finer screen with further removal of solids. A further output from the cyclone separator, of substantially clean liquid is fed partly back into the holding tank and partly back into the storage facility. Agitation of the waste material in the storage facility can be provided.

17 Claims, 4 Drawing Sheets

U.S. PATENT DOCUMENTS

| | | | |
|---|---|---|---|
| 4,350,596 A * | 9/1982 | Kennedy, Jr. ............... 210/708 |
| 4,459,207 A | 7/1984 | Young |
| 4,474,254 A | 10/1984 | Etter et al. |
| 4,541,933 A * | 9/1985 | Armold et al. ............. 210/780 |
| 4,634,535 A | 1/1987 | Lott |
| 4,696,353 A | 9/1987 | Elmquist et al. |
| 4,738,540 A | 4/1988 | Banks |
| 4,809,791 A | 3/1989 | Hayatdavoudi |
| 4,818,400 A * | 4/1989 | Russell et al. ............. 210/262 |
| 4,849,116 A * | 7/1989 | Weinmann et al. ......... 210/770 |
| 4,863,277 A | 9/1989 | Neal et al. |
| 4,911,834 A | 3/1990 | Murphy |
| 5,090,498 A | 2/1992 | Hamill |
| 5,185,087 A * | 2/1993 | Lister et al. ................ 210/787 |
| 5,303,786 A | 4/1994 | Prestridge et al. |
| 5,570,749 A | 11/1996 | Reed |
| 5,582,727 A | 12/1996 | Foster |
| 5,593,600 A * | 1/1997 | Solomon .................... 210/787 |
| 5,779,355 A * | 7/1998 | Pullman .................... 366/137 |
| 5,814,230 A * | 9/1998 | Willis et al. ................ 210/710 |
| 5,853,583 A | 12/1998 | Shah |
| 6,073,709 A | 6/2000 | Hensley |
| 6,533,946 B2 * | 3/2003 | Pullman .................... 210/787 |
| 2001/0013492 A1 * | 8/2001 | Dias .......................... 210/409 |
| 2002/0104806 A1 * | 8/2002 | Pullman .................... 210/744 |
| 2004/0112847 A1 * | 6/2004 | Pullman .................... 210/806 |
| 2005/0183574 A1 * | 8/2005 | Burnett et al. ................ 95/271 |
| 2005/0205496 A1 * | 9/2005 | Pullman et al. ............. 210/712 |

\* cited by examiner

METHOD FOR TREATING BODY WASTE MATERIAL, AND APPARATUS THEREFOR

FIELD OF THE INVENTION

This invention relates to the treatment of fluid body waste material, particularly, though not exclusively, animal waste such as liquid manure on farms and the like.

With the increase in high density animal farming, and particularly with the increase in number and size of pig farms for example, the disposition of the body waste products, for example liquid manure, is becoming a large and potentially very expensive problem.

The waste material, such as liquid manure, often has a low solids content, is extremely odorous and exists in large volumes.

A potential use of the waste material exists if the solids content can be increased, that is if the waste material can be de-watered. However, conventional methods of increasing solids content of fluid materials, such as cyclone separation, or screening, have not proved successful for body waste material.

It is desirable to provide a mechanical apparatus which is relatively light and compact and which can be moved from place to place, if desired, or stationery, but which is also easy to operate and is cost effective.

SUMMARY OF THE INVENTION

Broadly stated, the present invention provides a method for treating fluid body waste material comprising pumping waste material from a storage facility to a treating facility, the pumped material entering a distribution chamber. From the distribution chamber the material is delivered to a first vibrating screen to partially separate solids from liquids, the retained solid material discharged to a storage container and partially cleansed liquid passing the screen into a holding tank. Liquid is pumped from the holding tank to at least one cyclone separator, a first stream from the separator, containing larger particles, discharging on to a second vibrating screen and a second stream from the separator, comprising substantially cleansed liquid, being delivered to a trough. A first stream of liquid is discharged from the trough to the holding tank, and a second stream of liquid is discharged from the trough back to the storage facility.

Preferably the second stream of liquid from the trough is less than the first stream.

In particular, the liquid pumped from the holding tank is fed to a manifold, and then fed from the manifold to the cyclone separator.

In a further aspect of the invention a portion of the liquid in the manifold is sprayed into the distribution chamber.

In another aspect of the invention one or both screens can be inclined.

In other aspects of the invention, the flow of liquid from the manifold to the cyclone may be controlled, and the flow of liquid from the trough to the storage facility may be controlled.

Further, the flow of the waste material from the storage facility to the distribution chamber may be controlled.

In a further feature, a portion of the liquid pumped from the holding tank to the manifold is fed back to the holding tank to agitate the contents of the holding tank.

In yet another feature, the material in the distribution chamber is fed on to a vibrating weir plate prior to delivery to said first vibrating screen, and further, the first stream from the cyclone separator is discharged on to a second vibrating weir plate prior to discharge on to the second vibrating screen.

Further, agitation of the material in the storage facility can be provided.

BRIEF DESCRIPTION OF THE DRAWINGS

Preferred embodiments of the present invention will now be described, by way of example only, with reference to the attached Figures, wherein.

DETAILED DESCRIPTION OF THE INVENTION

Figure 1:
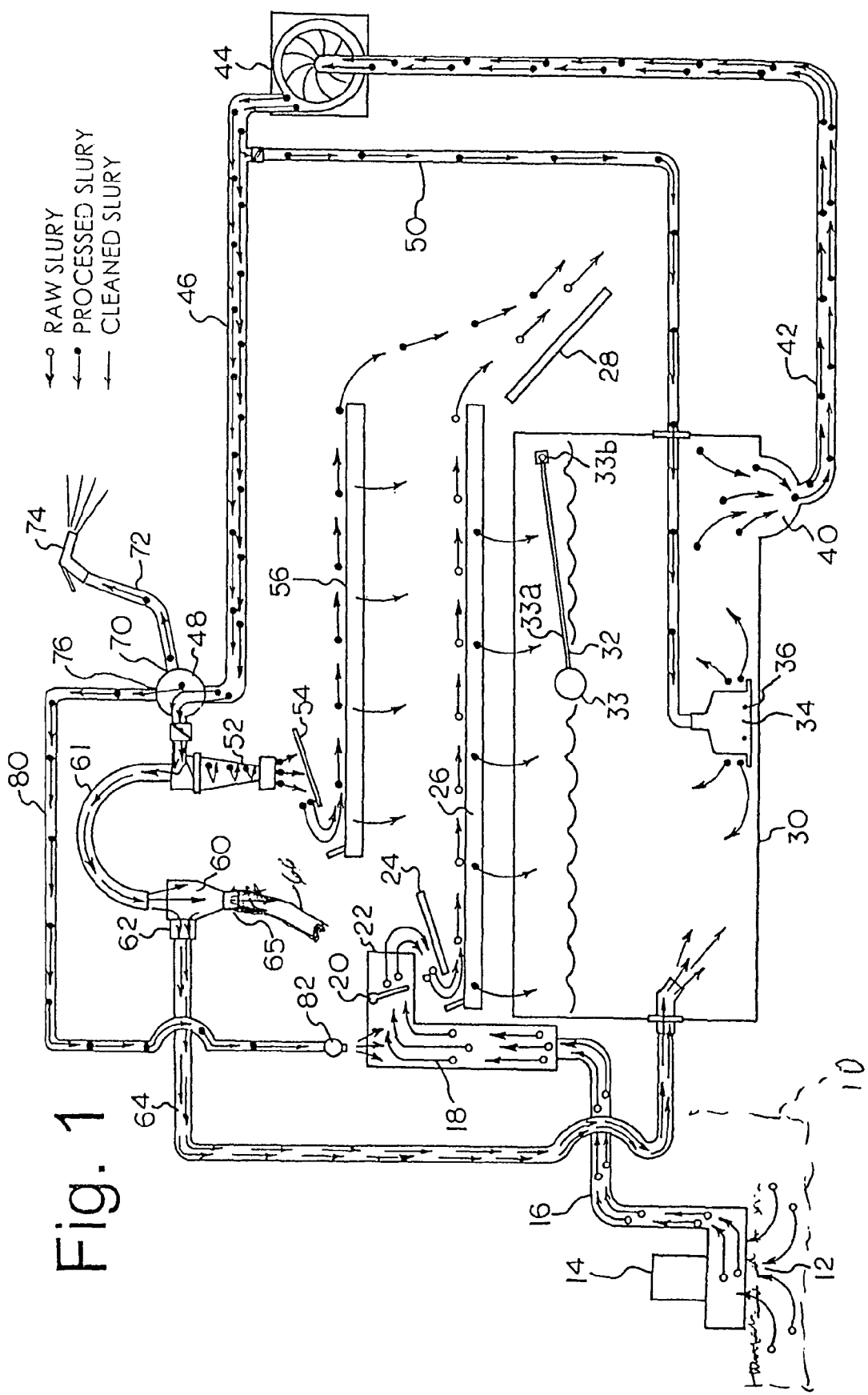
FIG. 1 is a diagrammatic and schematic diagram illustrating an apparatus for treating fluid body waste material in accordance with the invention.
Figure 2:
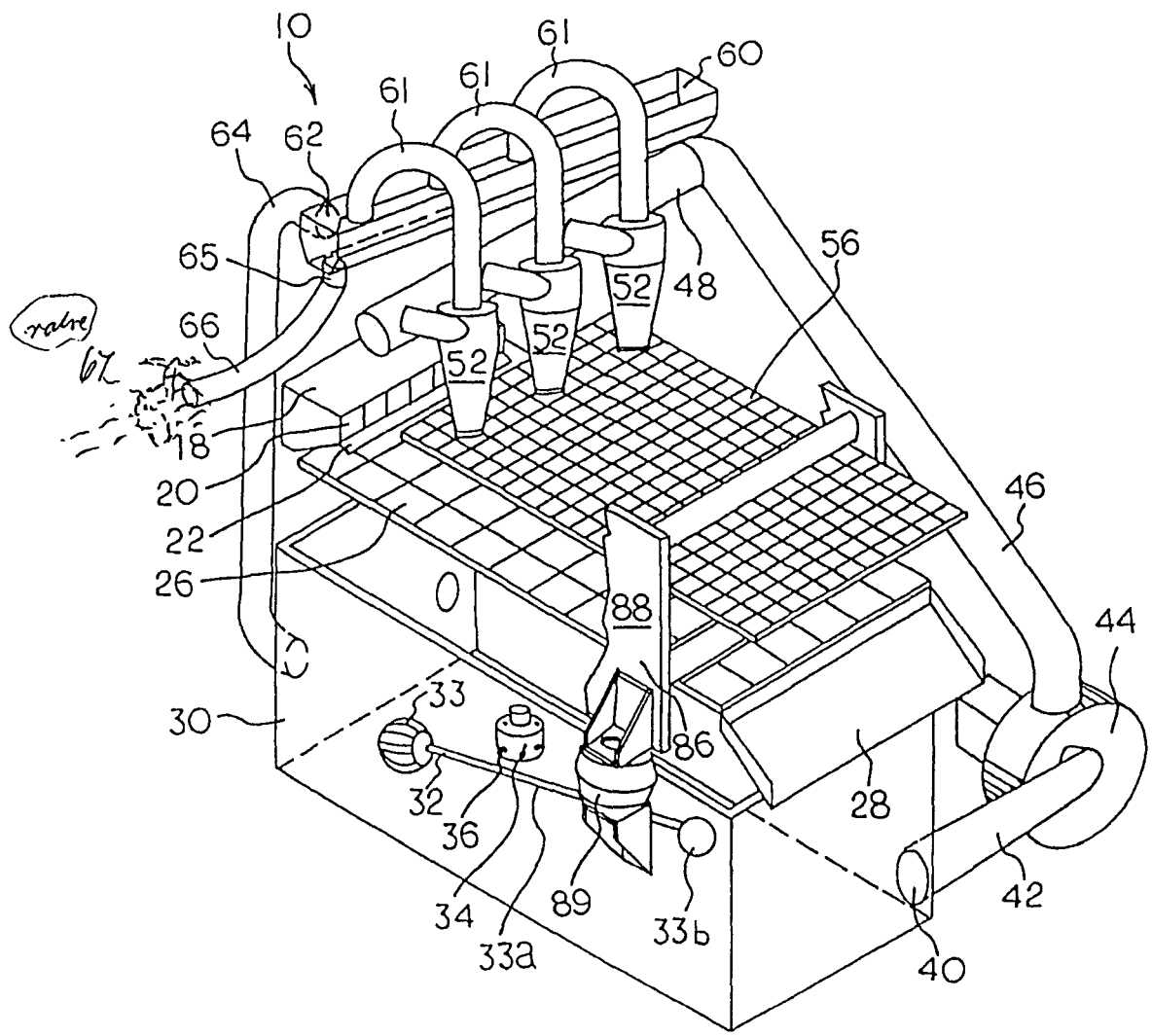
FIG. 2 is a diagrammatic perspective view of the apparatus in FIG. 1, partly cut away.
Figure 3:
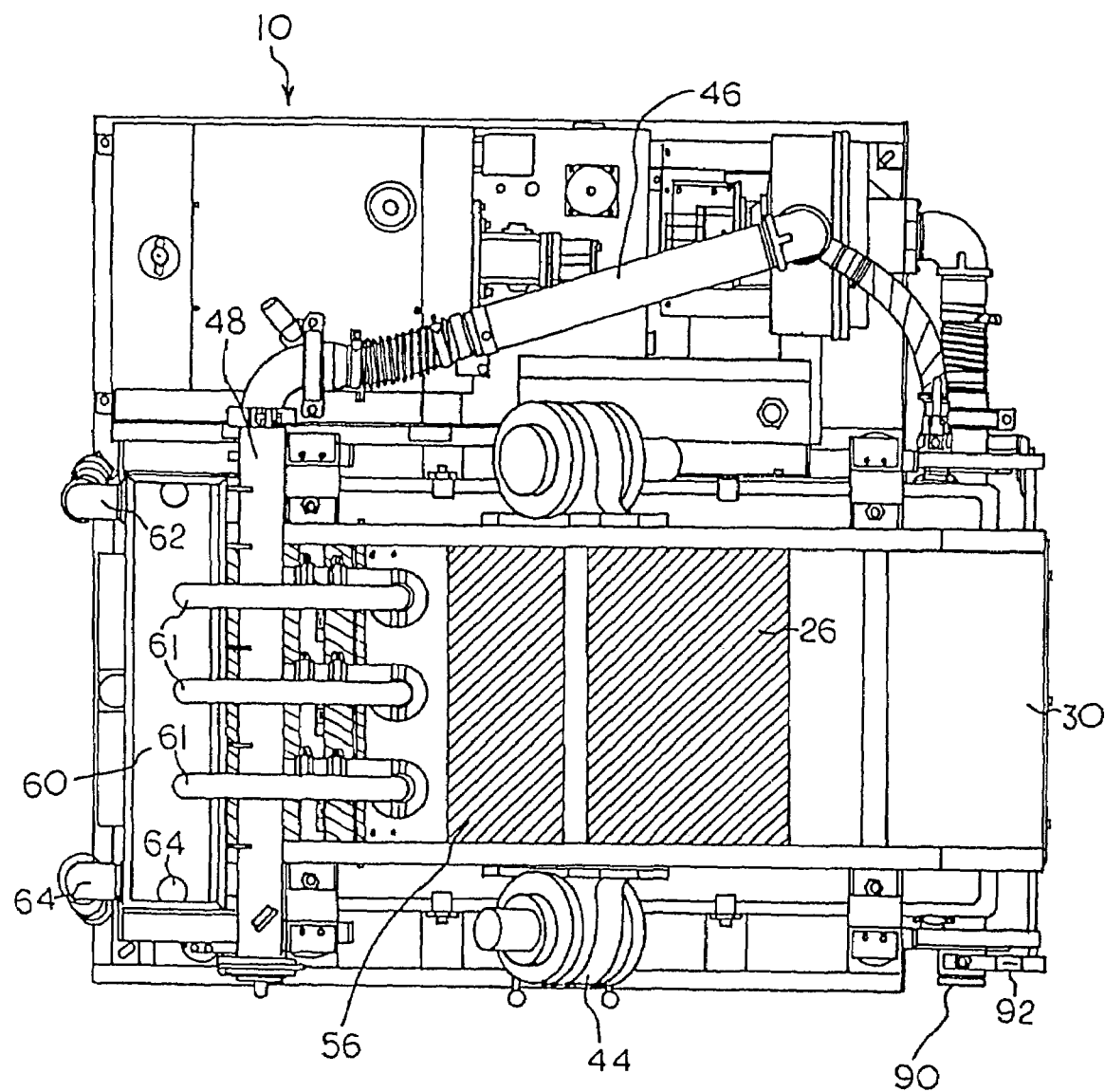
FIG. 3 is a top plan of the apparatus in FIGS. 1 and 2.
Figure 4:
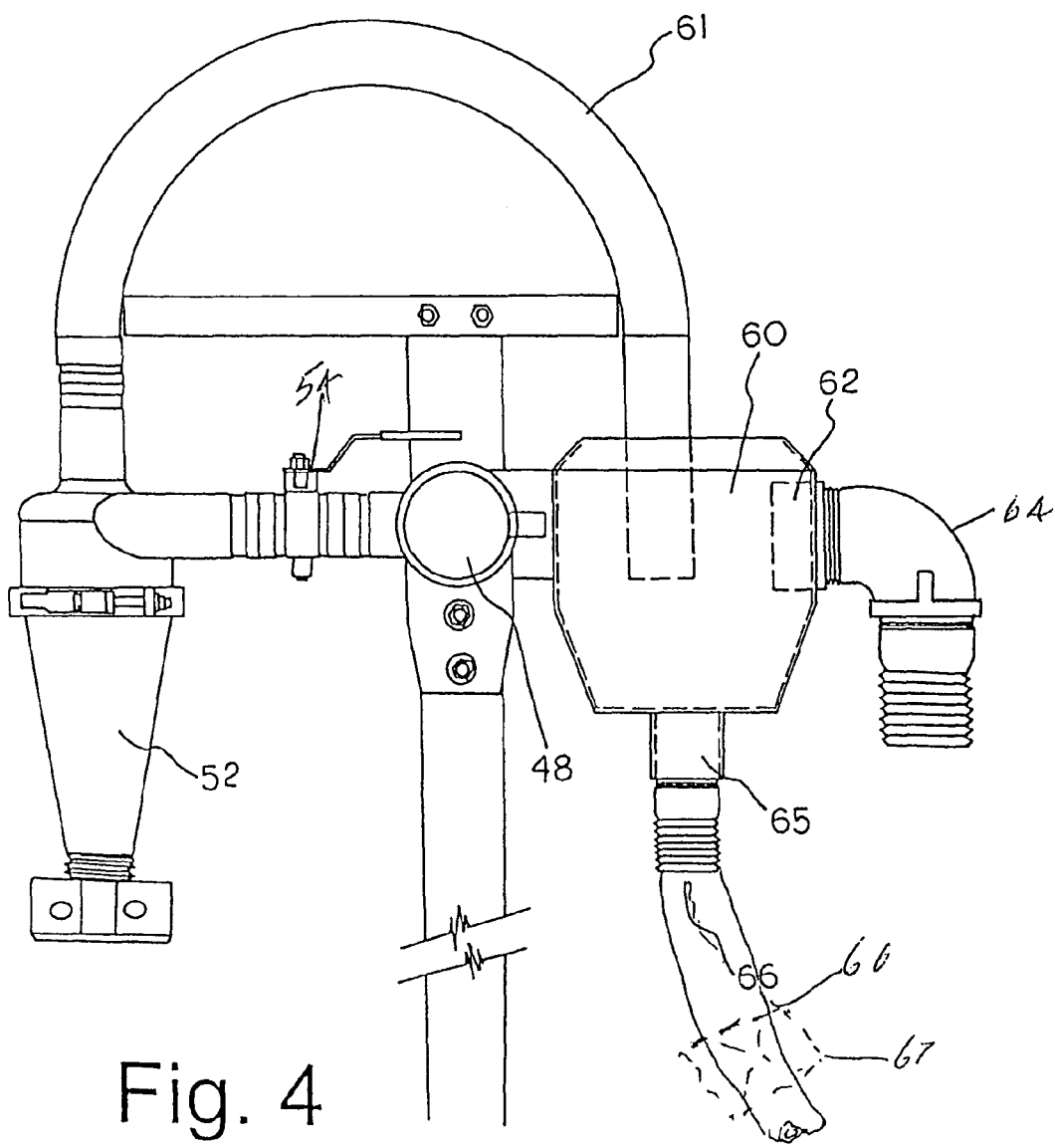
FIG. 4 is a diagrammatic sub view of the cyclone portion of the apparatus, to a larger scale.

FIG. 1 shows a fluid treatment cycle carried out by an apparatus for treating fluid body waste material in accordance with the present invention, illustrating various separation stages, for example by filter beds and cyclones. The treatment cycle will be understood by the following description of FIGS. 2 to 4 in conjunction with FIG. 1.

The body waste material is stored for example in one or more containers, such as concrete pits, illustrated in FIG. 1, very diagrammatically, by dotted outline 10. Waste material 12 is pumped, by submersible pump 14, into an inlet hose 16. From hose 16 the waste material enters an elongate distribution chamber 18, which spans the width of the apparatus. The chamber 18 controls the waste material via one or more flow regulating gates 20 mounted near the outlet of the chamber. The chamber 18 has an exit slot 22 which discharges waste material 12 via gravity onto a vibrating weir plate 24 to dampen the fall. The waste material is then deposited onto a first vibrating shaker screen deck 26 which carries out an initial separation of the waste material 12 into a first, increased liquid portion, and a second portion having an increased solids content. The separated, increased solids material is "walked" off the end of the deck by the vibratory action of the deck 26 to a spill chute 28, from where it is deposited into a storage container, not shown. The screen deck is vibrated by a conventional motor and linkage means, which is described below.

The first, increased liquid portion of the waste material passes through the screen deck 26 and enters a holding tank 30 which is positioned directly below the screen deck. The holding tank consists of a large, open top rectangular tank. Within the tank, a float control 32 floats on the surface of the fluid, and controls the operation of the submersible pump 14 and thus prevents system overflow. The float control 32 comprises a hollow sphere 33 at the end of a rod 33(*a*). The rod 33(*a*) is pivotally joined to a support 33(*b*) and controls a switch (not shown). Waste material within the tank 30 is mixed by a gun 34 centrally located inside the tank. The gun 34 consists of multiple jets 36 which stir, blend and agitate the fluids and any sediments located inside the tank 30. The gun 34 receives a supply of pressurized fluids in a manner which will be described below.

Fluid within the tank 30 is discharged through a discharge outlet 40 which removes the mixed and partly separated waste material from the tank. The outlet leads into a conduit 42, which empties into a centrifugal pump 44 which draws the waste material through the conduit 42. The pump directs the waste material into a further conduit 46, and thence into a pressurized controlled, sealed manifold 48 having multiple outlets. Prior to entry into the manifold 48, a portion of the waste material is directed into a secondary conduit 50, which leads to the gun 34 and delivers a supply of pressurized, partly cleansed fluid to the gun for mixing the material within the tank 30 as described above.

Liquid exits the manifold 48 into a bank of cyclonic separators ("cyclones") 52, operating in parallel. The cyclones 52 each separate the partly cleansed fluid into a first fluid stream containing larger particulates, and a second stream which is substantially cleansed of particulates. The first stream exits the bottom of the cyclones 52 and falls onto a vibrating weir plate 54 which dampens its fall. The fluid then is deposited onto a second vibrating shaker deck 56, which has finer screen characteristics than the first deck. The second deck 56 permits liquid to be removed from heavier materials, the latter being vibrated or walked off of the end of the deck, to the spill chute 28 and into the storage container. The second deck 56 is mounted directly over the first deck 36. Thus, screen liquid falls down onto the first deck 26 and aids in diluting the raw waste material as it passes over the first and also helps in reducing any buildup in the screened particulates. The liquid then enters the holding tank 30, for re-circulation through the system. Control valves 54 (FIG. 4) can be provided between the manifold 48 and each cyclone 52, to control flow to the cyclones, if desired.

The second stream exiting the cyclone bank 52, which has been substantially cleansed of particles, is routed via conduit 61 to an open trough 60, where it collects. The trough 60 has two discharge outlets. A first outlet 62 is located near the top of the trough and exits into a conduit 64 which directs the liquid back into the holding tank 30 to be mixed and pumped back though the cyclone bank 52. This creates a continuous loop effect for cleansing the liquid through multiple cycles. This arrangement works well with a cyclonic-type cleanser, which works best with multiple passes to reduce particulate count. A second discharge outlet 65 from the trough 60 is located at or near the bottom of the trough 60, and is of a smaller size than the first discharge outlet 62. The second discharge outlet 65 discharges cleansed liquid from the system. The outlet 65 is connected to a discharge pipe 66. The relatively smaller size of the second discharge outlet 65, coupled with a gravity withdrawal means, and a metering valve, results in at least a substantial portion of the purified liquid exiting through the first discharge outlet 62 for re-circulation through the system. This results in most of the waste material passing through the system several times before exiting. Referring to the manifold 48, two further outlets, selectively withdraw partly cleansed liquid from the manifold. One such outlet 70 communicates with a flexible hose or wand 72, terminating in a hand-operable sprayer 74. The sprayer permits an operator to clean components of the system such as the shaker trays, by spraying the partly cleansed liquid onto built material. Another outlet 76 leads to conduit 80, which directs the liquid into a jetting bar 82 which communicates with the inlet chamber 18. The jetting bar 82 utilizes the cleansed fluid and pressure from within the manifold 48 to direct a stream of partially cleansed liquid into the incoming waste material. This aids in cleansing and diluting the flow and enhances the effect of the first vibrating shaker deck 26. The metering control valve 67 (FIG. 2) can be positioned in the pipe 66, as shown, to provide some additional control of the flow through pipe 66, if desired.

The upper and lower screen decks 26 and 56 are supported by a common frame 86. The frame 86 includes vertical supports 88, which attach to the frame 86 via spring mounts 89. A conventional motor arrangement 44 drives the frame 86 in a reciprocating vibratory motion. The motor arrangement 44 comprises two hydraulically-driven counterweights (vibrators), mounted to the frame.

The whole apparatus can be mounted on a support structure, such as a wheeled frame, for mobility.

In a particular use, in treating liquid manure waste material on a pig farm, the manure was successfully treated by the apparatus and method described above.

At the particular farm site there were two pits. One, an open topped pit, 10 feet×12 feet, had a waste material of a very light nature—approximately 5–10% solids. The other, an open topped pit, 50 feet×12 feet, had a heavier mixture—up to about 25% solids.

The apparatus was as described above and illustrated in the drawings. The decks 26, 56, for the particular tests, had a −3° back fall, that is the retained material moves up-hill to the chute. The screen sizes were 70 mesh on the lower deck and 95 mesh on the upper deck 56. There were four cyclones 52. The clean liquid fed from the trough 60 via discharge outlet 65 was fed via the conduit 66, a 3 inch hose, back into the pit being treated. The substantially dry separated material was discharged into a loader bucket via chute 28 for convenience. The substantially dry material can be fed to any convenient storage arrangement.

Depending upon the characteristics of the waste material, for example solids content, the angle of the vibrating screens can vary for example from about +5° to about −5°. Also, the mesh size of the screens can be varied. For example, the bottom screen can vary from 10 mesh to 300 mesh and the top screen can vary from 11 mesh to 400 mesh, the top screen always a finer mesh than the bottom screen, as stated.

In a first test the apparatus was positioned adjacent the pit holding the light mixture material. The pump 14 was lowered into the pit to the bottom where the highest concentration of solids occurs. No agitation of the material in the pit occurred. The cleansed liquid was routed back to the pit. The waste material was passed through the apparatus without any problems. Approximately 1000 gallons was treated. The apparatus performed well but as the pit had a very low solids content, it was not exemplary of the abilities of the apparatus.

The second test was to the other pit, containing the heavier solids mixture. This was considered a better test of the method. The pump 14 was lowered into the pit and the waste material 12 pumped through hose 16 to the apparatus. The solids were very heavy for the first 1000–1500 gallons of material. This was due to the fact that the pit was not agitated and the pump 14 was at or near the bottom of the pit where the heaviest solids were concentrated. The apparatus performed exceptionally well even with the heavy solids content. As the waste material passed through the apparatus, with the return of cleansed liquid via hose 66 to the pit, the waste material became less concentrated with solids. A series of test samples were taken at around the 1300 gallon point of the cycle. These are labeled #1, #2, #3 and #4 in the following table. A second series of samples were taken at approximately the 4000 gallon point of the cycle. These are labeled #5, #6, #7 and #8 in the following table.

In a further test, the pump 14 was re-positioned on the pit bottom to access the dense material at the bottom. As the material was pumped through the apparatus, a third series of test samples were taken. These are labeled #9, #10, #11 and #12 in the following table.

While some agitation of the waste material in the pit will occur by the returned cleansed liquid, improved operation can be obtained by actively agitating the waste material. This can be obtained by mechanical means, by pumping in air for example, or by deliberately causing the returned liquid to stir up the heavier solids at the bottom of the pit.

The apparatus performed well during the operation and the 5000–6000 gallons that were pumped from the second pit produced approximately 2 cubic yards of pileable solids that were relatively dewatered.

In the following table, samples 1, 5 and 9 were of inflow from pit; samples 2, 6 and 10 were of outflow (cleaned fluid), samples 3, 7, and 11 were of separated solids, bottom screen, and samples 4, 8 and 12 were of separated solids, top screen.

TABLE A

| | | 1 | 2 | 3 | 4 | 5 | 6 | 7 | 8 | 9 | 10 | 11 | 12 |
|---|---|---|---|---|---|---|---|---|---|---|---|---|---|
| Dry matter | % | 2.9 | 2.8 | 14.9 | 31.7 | 2.6 | 2.6 | 15.4 | 29.6 | 3.6 | 3.0 | 18.3 | 40.0 |
| Total Nitrogen | % | 0.51 | 0.52 | 0.65 | 0.86 | 0.50 | 0.50 | 0.70 | 0.81 | 0.53 | 0.53 | 0.59 | 0.83 |
| Ammonium | ppm | 4524 | 4470 | 4085 | 3660 | 4420 | 4350 | 4030 | 3920 | 4466 | 4470 | 4080 | 3080 |
| Phosphorous | % | 0.06 | 0.06 | 0.36 | 2.81 | 0.04 | 0.04 | 0.38 | 2.04 | 0.08 | 0.07 | 0.32 | 4.79 |
| Potassium | % | 0.25 | 0.25 | 0.25 | 0.34 | 0.27 | 0.24 | 0.25 | 0.32 | 0.26 | 0.27 | 0.24 | 0.36 |
| Magnesium | % | 0.02 | 0.02 | 0.08 | 0.38 | 0.01 | 0.01 | 0.06 | 0.29 | 0.03 | 0.03 | 0.05 | 0.56 |
| Calcium | % | 0.08 | 0.07 | 0.52 | 3.28 | 0.05 | 0.05 | 0.59 | 2.43 | 0.11 | 0.08 | 0.55 | 6.70 |
| Sodium | % | 0.07 | 0.07 | 0.07 | 0.10 | 0.08 | 0.07 | 0.07 | 0.10 | 0.07 | 0.07 | 0.07 | 0.13 |
| Iron | ppm | 61 | 64 | 254 | 3984 | 40 | 40 | 254 | 5970 | 81 | 77 | 292 | 2246 |
| Manganese | ppm | 11 | 11 | 58 | 160 | 7 | 7 | 63 | 142 | 14 | 14 | 44 | 212 |
| Copper | ppm | 9 | 12 | 20 | 38 | 8 | 7 | 16 | 34 | 14 | 15 | 16 | 28 |
| Zinc | ppm | 34 | 39 | 88 | 207 | 20 | 22 | 68 | 188 | 46 | 47 | 62 | 244 |
| C.N ratio | | 1.7:1 | 1.7:1 | 9.3:1 | 8.5:1 | 1.6:1 | 1.6:1 | 9.6:1 | 9.0:1 | 2.2:1 | 1.7:1 | 13.2:1 | 8.2:1 |
| Nutrient Value where manure is applied and covered with soil immediately | Nitrogen ($N_{16}$) lb/ton | 45.8 | 45.8 | 8.7 | 8.3 | 44.8 | 44.2 | 8.7 | 8.7 | 45.5 | 45.5 | 8.5 | 7.2 |
| | Phosphate ($P_{2O5}$) lb/ton | 5.5 | 5.5 | 6.6 | 51.7 | 3.7 | 3.7 | 7.0 | 37.5 | 7.4 | 6.4 | 5.9 | 88.1 |
| | Potash ($K_{2O}$) lb/ton | 27.0 | 27.0 | 5.4 | 7.3 | 29.2 | 25.9 | 5.4 | 6.9 | 28.1 | 29.2 | 6.2 | 7.8 |

The originating fluid liquid waste material, as stated, presents a large problem. In its fluid state it cannot be spread over agricultural land, because of smell and other environmental problems. Once the solids have been substantially dewatered, then these can be spread over agricultural land, or possibly further dried. After composting or other treatment, the solids can be packaged.

While the above description has been particularly directed to the treatment of swine waste material, the invention is equally applicable to other animal body waste material, for example, cows, sheep and other dairy operations. The invention is also applicable to the treatment of human body waste material.

Depending upon the circumstances, a single unit of the apparatus can be moved from storage container to storage container, where multiple storage containers are used. The apparatus can be operated for a particular time at each container. Alternatively, a unit can be positioned at each pit and operated for periods of time as considered necessary. In a further alternative, a central unit can be provided, connected by piping to a pump in each storage container. Suitable valving would be provided to select the particular container, or containers, that are being treated.

Although a preferred embodiment of the present invention has been described, those of skill in the art will appreciate that variations and modifications may be made without departing from the spirit and scope thereof as defined by the appended claims.

What is claimed is:

1. A method for treating liquid manure, comprising the steps of:
    pumping liquid manure from a storage facility to a distribution chamber;
    delivering said liquid manure over a first vibrating screen, to partially separate solids from liquids;
    discharging retained material on said first screen to a storage container;
    discharging partially cleansed liquid through said first screen into a holding tank;
    pumping liquid from said holding tank to at least one cyclone separator;
    discharging a first stream from said cyclone separator, containing larger particles on to a second vibrating screen, to further separate solids from liquids, and delivering a second stream from said cyclone separator, comprising substantially cleansed liquid, to a trough;
    discharging a first steam of liquid from said trough to said holding tank, to form a loop treatment cycle; and
    discharging a second stream of liquid from said trough back to said storage facility.

2. A method as claimed in claim 1, wherein said second stream from said trough is less than said first stream.

3. A method as claimed in claim 1 including pumping liquid from said holding tank to a manifold and feeding said material from said manifold to said at least one cyclone separator.

4. A method as claimed in claim 3, including feeding said material from said manifold to a plurality of cyclone separators.

5. A method as claimed in claim 4, including spraying a portion of said liquid in said manifold into said distribution chamber.

6. A method as claimed in claim 3, including controlling the flow of liquid from said manifold to said at least one cyclone separator.

7. A method as claimed in claim 3, including by-passing a portion of liquid pumped from said holding tank to said manifold back to said holding tank to agitate contents of said holding tank.

8. A method as claimed in claim 1, including controlling the flow of liquid from said trough to said storage facility.

9. A method as claimed in claim 1, including controlling the pumping of said liquid manure from said storage facility to said distribution chamber.

10. A method as claimed in claim 1, including feeding liquid manure pumped from said storage facility to a first vibrating weir plate prior to delivery to said first vibrating screen.

11. A method as claimed in claim 1, wherein at least one of said vibrating screens is inclined.

12. A method as claimed in claim 12, wherein said vibrating screens are inclined at an angle of between +5° and −5°.

13. A method as claimed in claim 13, wherein said vibrating screens are inclined at an angle of −3°.

14. A method as claimed in claim 1, wherein said first vibrating screen has a mesh size from 10 to 300 and said second vibrating screen has a mesh size from 11 to 400, the mesh size of said second vibrating screen being finer than the mesh size of said first vibrating screen.

15. A method as claimed in claim 15, wherein said first vibrating screen has a mesh size from 50 to 200 and said second vibrating screen has a mesh size from 100 to 400.

16. A method as claimed in claim 16, wherein said first vibrating screen has a mesh size of 75 and said second vibrating screen has a mesh size of 90.

17. A method as claimed in claim 1, including agitating the liquid manure in said storage facility.

* * * * *